No. 625,167. Patented May 16, 1899.
G. N. HOLLAND.
CULTIVATOR.
(Application filed June 28, 1898.)
(No Model.) 2 Sheets—Sheet 1.
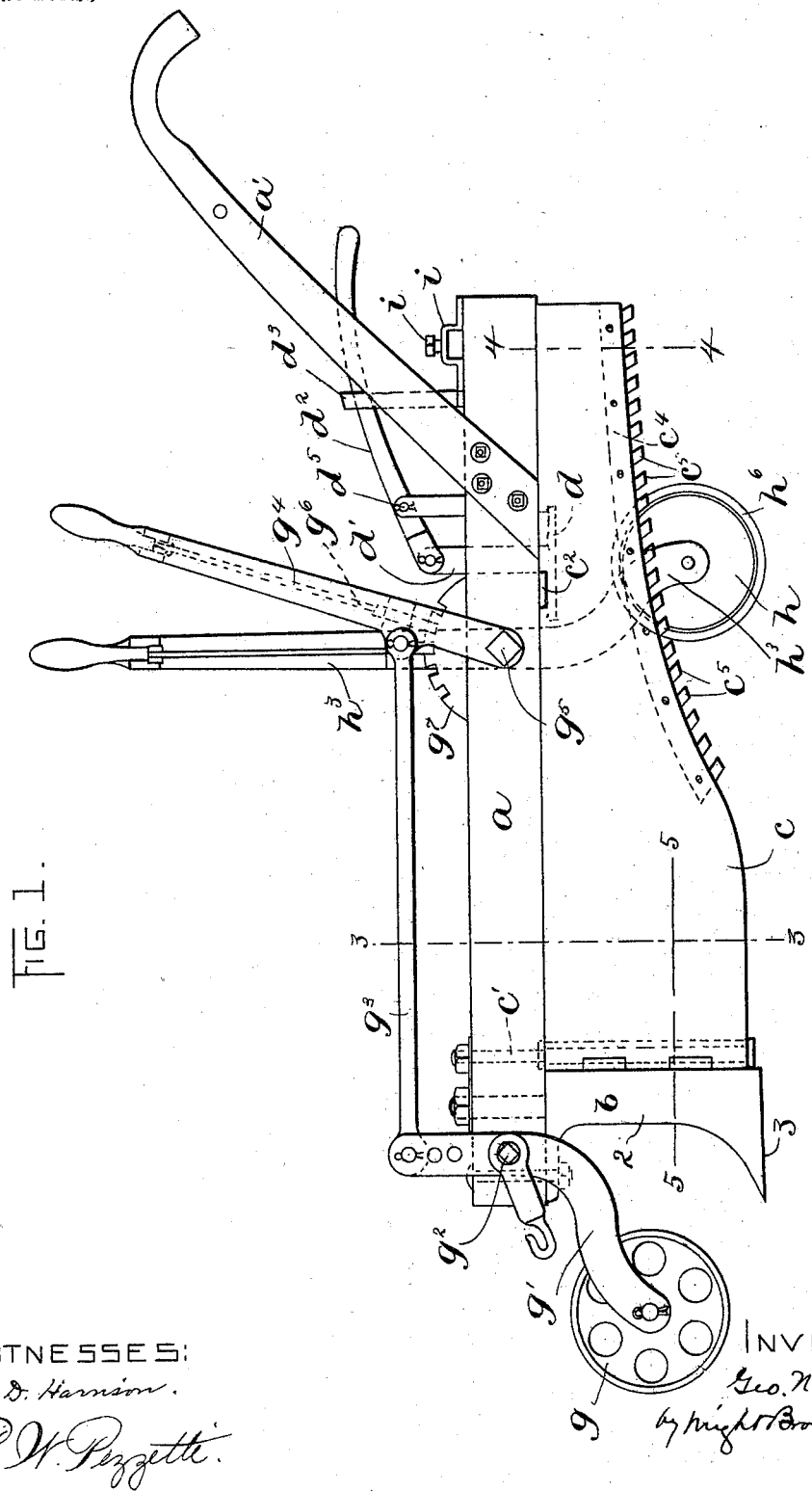
WITNESSES:
A. D. Harrison.
P. W. Pezzetti.
INVENTOR:
Geo. N. Holland
by Wright Brown & Quimby
attys.

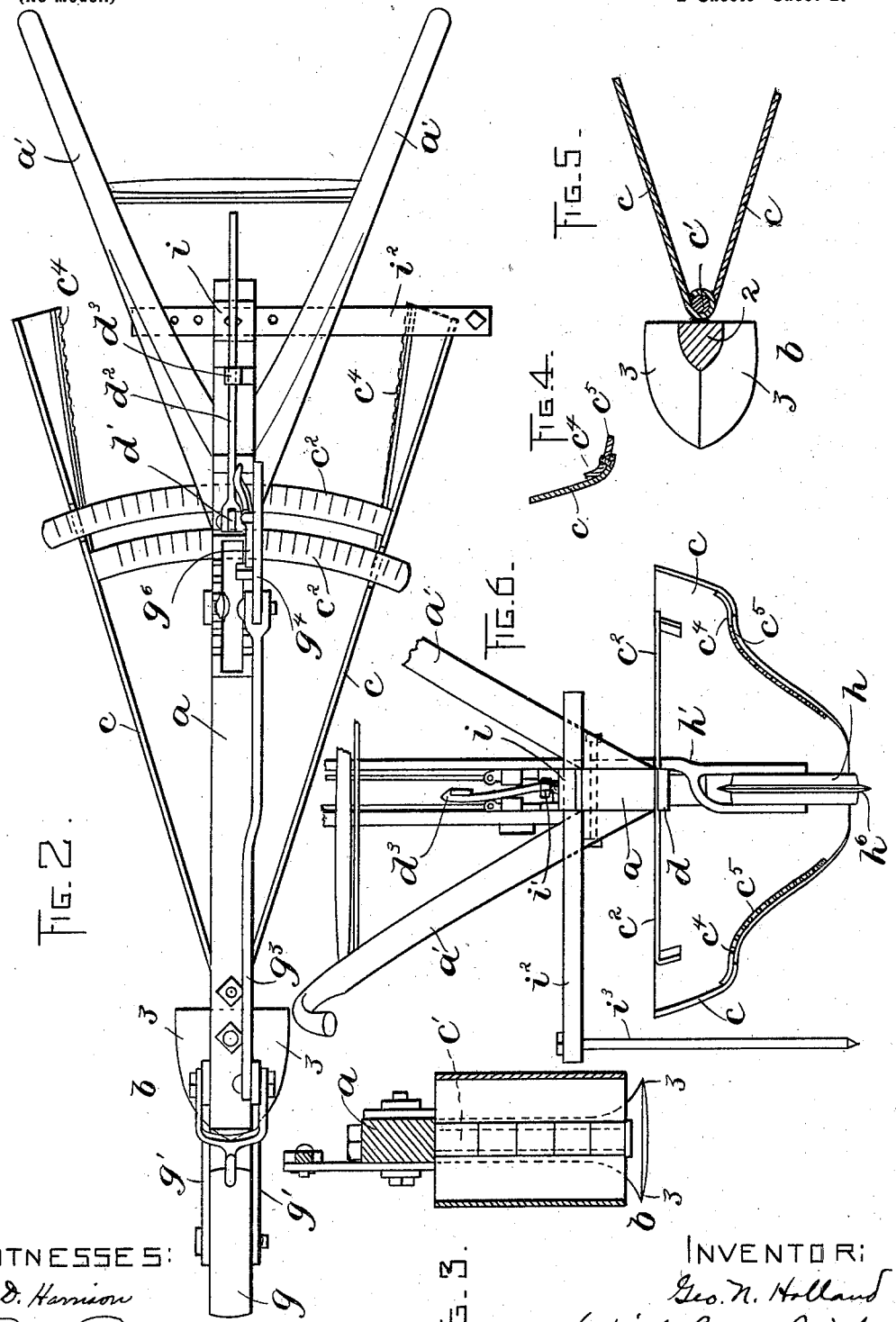

UNITED STATES PATENT OFFICE.

GEORGE N. HOLLAND, OF HAMPDEN, MAINE, ASSIGNOR OF ONE-HALF TO ALBERT A. SMITH, OF SAME PLACE.

CULTIVATOR.

SPECIFICATION forming part of Letters Patent No. 625,167, dated May 16, 1899.

Application filed June 23, 1898. Serial No. 684,225. (No model.)

*To all whom it may concern:*

Be it known that I, GEORGE N. HOLLAND, of Hampden, in the county of Penobscot and State of Maine, have invented certain new and useful Improvements in Cultivators, of which the following is a specification.

This invention has for its objects to provide a cultivator adapted to form a drill or furrow for the reception of seed, to cover seed deposited in furrows, and to hoe or hill up the earth along the sides of rows of growing plants.

The invention also has for its object to provide for a machine of this class a marking attachment for use in furrowing to insure the parallelism of the rows.

The invention consists in the improvements which I will now proceed to describe and claim.

Of the accompanying drawings, forming a part of this specification, Figure 1 represents a side elevation of a cultivator embodying my invention. Fig. 2 represents a top plan view of the same. Fig. 3 represents a section on line 3 3 of Fig. 1. Fig. 4 represents a section on line 4 4 of Fig. 1. Fig. 5 represents a section on line 5 5 of Fig. 1. Fig. 6 represents a rear elevation of my improved cultivator.

The same letters and numerals of reference indicate the same parts in all the figures.

In the drawings, $a$ represents the beam of my improved cultivator, the same being provided with suitable handles $a'$ at its rear end.

$b$ represents a furrowing-plow attached to the forward portion of the beam and comprising a relatively narrow vertical shank 2, which is sharpened at its forward edge, and an approximately triangular bottom portion 3 3, the edges of which are sharpened, while their sides curve upwardly and join the sides of the shank 2, the preferred form of the plow being such that it will form a flat-bottomed furrow and form ridges of equal height at both sides of the furrow.

$c\ c$ represent hoe-blades, the forward ends of which are provided with hinge members which are connected with each other and with the beam $a$ by suitable means, such as an ordinary bolt $c'$, passing through the beam and through the hinge members formed on the blades $c$, the blades being thus adapted to swing, so that they can form any desired angle with reference to each other and to the beam. The blades $c\ c$ are provided with segmental arms $c^2\ c^2$, which extend inwardly from the upper edges of the blades and across the bottom edge of the beam.

$d$ represents a clamp which is adapted to press upwardly against the under sides of the arms $c^2$, the arms being secured between the clamp and the bottom surface of the beam. The clamp may be operated by any suitable means, such as a rod $d'$, passing through the beam $a$, and a lever $d^2$, pivoted at $d^5$ to a bracket on the beam and adapted to be held by a catch $d^3$ in position to hold the clamp pressed upwardly against the under sides of the arms $c^2$. The arms $c^2$ are preferably graduated on their upper surfaces to enable the operator to adjust them so that their rear ends will be at any desired distance apart.

The lower edges of the blades $c$ are inclined upwardly and preferably curved from points near their hinged forward ends to their rear ends, as indicated in Fig. 1, this form enabling the blades to give curved or rounded sides to the hills or ridges formed by their action on the earth raised and loosened by the plow $b$. The blades $c$ are preferably curved in cross-section, as indicated in Fig. 4, their lower edges being curved inwardly along the inclined portions above described. This inward curvature causes the outer sides of the blades to present rounded surfaces to the growing plants encountered in the operation of hoeing or hilling, so that the blades do not break or injure the plants, but slide over them without injury. The blades $c$ may be of relatively thick sheet metal or of rolled plate metal or they may be castings.

$c^4\ c^4$ represent plates bolted to the lower inclined edges of the blades $c$, said plates being provided on their lower edges with teeth $c^5$, which project below the edges of the blades $c$, as shown in Figs. 1 and 4. The plates $c^4$ are preferably detachable from the blades $c$ and are intended for use particularly in scratching or slightly disturbing the surface of the ground without hoeing or hilling up, the object being to keep the moisture in the ground and remove small weeds. The teeth $c^5$ are so shaped that the dirt is pushed up the sides of the hills as fast as it rolls down, so that the hill is neither torn down nor built up, but its shape is preserved. When the cultivator is in use for furrowing and hilling, the toothed plates $c^4$ may be removed, if desired. The toothed plates $c^4$ are preferably castings.

$g$ represents an adjustable gage-roller, which is connected with the beam $a$ and runs in front of the plow $b$. The roller $g$ is journaled in bearings in arms $g'$, which are pivoted at $g^2$ to the beam $a$, one of these arms being extended above the beam and connected by a rod $g^3$ with a lever $g^4$, which is pivoted at $g^5$ to the beam and is provided with a locking-dog $g^6$, adapted to engage a notched segment $g^7$, affixed to the beam $a$. By means of the lever $g^4$ and the accompanying devices I am enabled to quickly raise and lower the gage-roller $g$, the arrangement being such that the roller can be adjusted at any desired height with relation to the bottom of the plow $b$, thus regulating the depth of the plow, and, if desired, raising the plow entirely above the ground, as when it is desired to simply transport the cultivator from place to place without operating it or when it is desired to use the teeth $c^5$ for scratching the surface of the hills.

$h$ represents another gage-roller connected with the beam $a$ behind the hinged ends of the hoe-blades $c$. The roller $h$ is also vertically adjustable, and it may be depressed below the bottom of the plow to coöperate with the roller $g'$ in holding the plow above the surface or it may be raised to coöperate with the roller $g$ in determining the depth of penetration of the plow. I have here shown as the means for adjusting the roller $h$ a lever $h^3$, pivoted at $g^5$ beside the lever $g^4$ and forked at its lower end to support the shaft of the roller $h$. The lever $h^3$ is provided with a locking-dog similar to the dog $g^6$, and said dog engages a notched segment on the beam. The periphery of the roller $h$ is provided with a sharp-edged flange $h^6$, which is adapted to penetrate the ground and thus guide the roller $h$ and the cultivator, the entrance of the flange $h^6$ into the ground preventing the roller and the cultivator from being deflected laterally.

I have provided the cultivator with a marking attachment consisting of a socket $i$, attached to the rear portion of the beam and provided with a spring-pressed bolt or pin $i'$ and a bar $i^2$, adapted to slide in the socket $i$ and provided with a series of holes each adapted to receive the locking-pin $i'$. One end of the bar is provided with a vertical marker $i^3$, which may be adjusted at any desired distance from the beam $a$ and makes a mark for the next furrow. When this device is used, the blades $c$ $c$ will be adjusted inwardly toward the beam to form a furrow of the desired width.

I claim—

1. A cultivator comprising a beam, a furrowing-plow affixed thereto, elongated hinged hoe-blades behind the plow, each blade having its lower edge inclined and curved inwardly, and means for adjustably securing the blades to the beam.

2. A cultivator comprising a beam, a furrowing-plow affixed thereto, elongated hinged hoe-blades behind the plow, each blade having its lower edge inclined and curved inwardly, and provided with a series of downwardly-projecting teeth, and means for adjustably securing the blades to the beam.

3. A cultivator comprising a beam, a clamping-plate movable toward and from the lower edge of the beam, a lever for operating said clamping-plate, a furrowing-plow attached to the forward portion of the beam, and hinged hoe-blades behind the plow, having segmental arms which are movable between the clamping-plate and beam.

4. A cultivator comprising a beam, a furrowing-plow affixed thereto, elongated hinged hoe-blades behind the plow, means for adjustably securing the blades to the beam, and a marking attachment comprising a socket on the beam provided with a locking device, and a bar movable in said socket and provided with a marker.

In testimony whereof I have affixed my signature in presence of two witnesses.

GEORGE N. HOLLAND.

Witnesses:
F. O. BEAL,
GEO. W. ROYALL.